United States Patent [19]

Sekmakas et al.

[11] 4,104,229

[45] * Aug. 1, 1978

[54] PIGMENTED LATEX PAINTS HAVING SUPERIOR GLOSS PREPARED BY GRINDING A PIGMENT INTO A SOLUTION OF A COPOLYMER OF AN UNSATURATED CARBOXYLIC ACID

[75] Inventors: Kazys Sekmakas, Chicago; Kenneth K. Hesler, West Chicago, both of Ill.

[73] Assignee: DeSoto, Inc., Des Plaines, Ill.

[ * ] Notice: The portion of the term of this patent subsequent to Nov. 15, 1994, has been disclaimed.

[21] Appl. No.: 767,327

[22] Filed: Feb. 10, 1977

Related U.S. Application Data

[63] Continuation of Ser. No. 589,876, Jun. 24, 1975, Pat. No. 4,058,499.

[51] Int. Cl.$^2$ ............................................. C08L 33/02
[52] U.S. Cl. ...................... 260/29.6 RW; 106/308 M; 260/29.4 UA; 260/29.6 WB; 260/42.54; 260/42.55
[58] Field of Search ............. 260/29.6 RW, 29.6 WB, 260/29.4 UA, 42.54, 42.55; 106/308 M

[56] References Cited

U.S. PATENT DOCUMENTS

| | | | |
|---|---|---|---|
| 3,150,110 | 9/1964 | Becker et al. | 260/17 R |
| 3,840,487 | 10/1974 | Dyson et al. | 260/29.6 RW |
| 3,844,990 | 10/1974 | Lindemann et al. | 260/42.55 |
| 3,896,070 | 7/1975 | Tummler et al. | 260/29.6 TA |
| 3,919,154 | 11/1975 | Chang et al. | 260/29.4 UA |

*Primary Examiner*—M. J. Welsh
*Attorney, Agent, or Firm*—Dressler, Goldsmith, Clement, Gordon & Shore, Ltd.

[57] ABSTRACT

A high gloss, water base, pigmented latex is provided by grinding a pigment into a water-free solution of a carboxyl-functional addition copolymer of monoethylenically unsaturated monomers including at least about 3% by weight of monoethylenically unsaturated carboxylic acid in water miscible organic solvent, the copolymer being at least partially neutralized with an amine, particularly an hydroxy amine, to render the said copolymer dispersible in water, and thereby form a nonaqueous pigment paste, and then mixing the nonaqueous pigment paste with an aqueous latex. The invention includes the latex paint so-produced.

9 Claims, No Drawings

PIGMENTED LATEX PAINTS HAVING SUPERIOR GLOSS PREPARED BY GRINDING A PIGMENT INTO A SOLUTION OF A COPOLYMER OF AN UNSATURATED CARBOXYLIC ACID

This application is a continuation of application Ser. No. 589,876, filed June 24, 1975, now U.S. Pat. No. 4,058,499, granted Nov. 15, 1977.

This invention relates to high gloss, water base, pigmented latex paints.

Conventional latex paints develop little gloss, as is well known. These conventional latex paints include pigment which is dispersed in the water phase by means of surfactants or wetting agents, and this leads to low gloss. The pigment is quite differently dispersed in this invention, leading to a very significant increase in gloss, as will be illustrated.

In accordance with this invention, a high gloss, water base, pigmented latex is provided by grinding a pigment into a water-free solution of a carboxyl-functional addition copolymer of monoethylenically unsaturated monomers including at least about 3% by weight of monoethylenically unsaturated carboxylic acid in water miscible organic solvent, the copolymer being at least partially neutralized with an amine, particularly an hydroxy amine, to render the said copolymer dispersible in water, and thereby form a nonaqueous pigment paste, and then mixing the nonaqueous pigment paste with an aqueous latex. The invention includes the latex paint so-produced.

Referring more particularly to the copolymer of monoethylenically unsaturated monomers containing a high level of carboxyl functionality, any addition copolymer of monoethylenically unsaturated monomers may be used, the usual monomers being acrylic or vinyl acetate, including at least about 3% by weight of monoethylenically unsaturated carboxylic acid.

Preferred monomers are combinations of methyl methacrylate and $C_2 - C_8$ alkyl esters of monoethylenically unsaturated carboxylic acids, such as those noted hereinafter, acrylate or methacrylate ester being preferred, such as ethyl acrylate, butyl acrylate, or isobutyl methacrylate. Styrene, vinyl toluene, or vinyl acetate may be used in place of the methyl methacrylate. Acrylonitrile may also be present. These are nonreactive monomers. Hydroxy functional monomers may also be present, such as 2-hydroxy ethyl acrylate, and amide groups are also permissible, such as provided by acrylamide, methacrylamide, or other monoethylenic carboxylic acid amide.

The copolymers are preferably solution copolymers which denotes copolymerization in organic solvent solution. Water miscible organic solvents are selected in this invention since the copolymer is used in water miscible organic solvent solution.

At least 3%, up to about 40% of the copolymer, is to be constituted by monoethylenically unsaturated carboxylic acid. Many acids are appropriate, particularly acrylic acid. Other appropriate acids are methacrylic acid, crotonic acid, itaconic acid, monobutyl maleate, and the like. Preferred proportions are from 15-30% of the copolymer. The smaller amounts of acid are suitable when the water solubility of the copolymer is improved by the presence of other water soluble monomers, such as hydroxy ethyl acrylate or acrylamide.

The solution copolymerization which is used is a conventional one which is carried out in solvent solution in the presence of a free radical polymerization catalyst. Preferred water miscible organic solvents are 2-ethoxy ethanol and 2-butoxy ethanol, though numerous others are well known and useful herein, such as isopropanol, acetone, and the like.

The copolymer solution is then at least partially neutralized with an amine, hydroxy amines giving the best results. Neutralization is carried out to the extent needed for subsequent dispersion in water, neutralization to at least about 50% of the acidity of the copolymer being generally contemplated.

While amines such as triethyl amine or ammonium hydroxide (usually considered an amine in the art of solubilizing carboxyl copolymers) are generally useful, hydroxy amines yield significantly better gloss. Hydroxy amines have the formula:

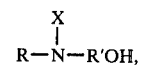

in which R is hydrogen or an alkyl group, preferably an alkyl group containing 1-4 carbon atoms, R' is an alkylidene group, preferably containing 1-4 carbon atoms, and X is either R or R'.

Appropriate hydroxy amines are illustrated by propanol amine, diethanol amine, dipropanol amine, dimethyl ethanol amine, dimethyl propanol amine, diethyl ethanol amine, methyl diethanol amine, ethyl diethanol amine, and the like. Tertiary amines containing at least one hydroxy group are particularly contemplated, and the invention will be illustrated using dimethyl ethanol amine.

While any pigment may be included in the paints of this invention, titanium dioxide pigment, both rutile and anatase, are particularly contemplated. The hydroxy amines are especially significant in achieving the effect of dispersion and high gloss containing results contemplated herein when titanium dioxide pigment is relied upon to provide the major proportion of the pigmentation. The proportion of pigment should be sufficient to provide a paste in known fashion. A pigment volume concentration of at least 10% is usual.

After neutralization of at least a portion of the carboxyl functionality contained in the copolymer solution, the pigment is added and conventional grinding is carried out to produce a pigment paste. The aqueous latex providing the bulk of the resin solids of the paint is then added either directly, or after preliminary admixture of a small amount of water, into the neutralized solvent solution.

The neutralized solution of carboxyl copolymer may contain any proportion of solvent to provide a viscosity appropriate for grinding in the pigment, generally an amount of from 10% to 150%, preferably 15% to 100%, based on the weight of the solution copolymer.

Any conventional emulsion copolymer latex used in the paint industry may be employed herein. Vinyl acetate-butyl acrylate copolymers, vinyl acetate-ethylene copolymers, and methyl methacrylate-ethyl acrylate copolymers illustrating the more usual paint latices, but the invention is not intended to be limited to any particular aqueous latex system. In general, aqueous emulsion copolymers having a $T_g$ below 20° C. are useful herein since these provide air dry paints. $T_g$ denotes the glass transition temperature and is well recognized to define the nature of an emulsion copolymer which is not significantly cross-linked in the emulsion.

The emulsion copolymerization used to form the latex is entirely conventional, and forms no part of this invention.

It will also be appreciated that in the final film which is formed on deposition and drying of the pigmented latex, the emulsion copolymer and the solution copolymer must blend together, so it is best to select combinations which are compatible with one another.

It is desired to call particular attention to some of the superior attributes which are obtained in pigmented paints formulated in accordance with this invention in comparison with other commercially available semi-gloss paints, aside from the significant improvement in gloss which is obtained. Thus, better visual hiding is obtained at the same level of pigmentation, and the pigment dispersing properties are superior. This enables dispersion in the absence of the surfactants normally introduced to aid in dispersing the pigment. This characteristic is particularly beneficial from the standpoint of processing because in the previous technique of grinding the pigment into water containing a surfactant, foaming was troublesome. Also, and from the product standpoint, higher solids content paints are enabled by this invention. The superior dispersion also enables darker colors using smaller amounts of prime pigment (the titanium dioxide), and the tendency of the pigment to flocculate is avoided.

From the standpoint of application, it has been found that wetting of the substrate is superior and the rheology of the coating is better, causing brush marks to flow out and become less discernible. The better wetting which is obtained enables the formulation of paints in which the polyester component normally introduced to provide the desired chalk penetration can be eliminated. As a result, one can wet chalky surfaces without introducing any tendency to yellow.

It is also possible in this invention to reduce the proportion of titanium dioxide pigment which is needed for hiding, and this is done by increasing the amount of extender pigment, such as aluminum silicate. This is not possible in the corresponding conventional system where aluminum silicate introduction reduces gloss.

Throughout this specification, and particularly in the examples and claims which follow, all proportions are by weight unless otherwise specified.

EXAMPLE 1

Water Soluble Acrylic Copolymer

Charge 1080 parts 2-butoxy ethanol into a reactor and heat to 125° C. Then premix, and add over a 3 hour period at 125° C., 360 parts methyl methacrylate, 1704 parts ethyl acrylate, 516 parts acrylic acid and 76.8 parts benzoyl peroxide. Hold for 1 hour at 125° C. after addition is complete. Add 12 parts of tertiary butyl perbenzoate, and hold for 1½ hours at 125° C. Then cool to provide a copolymer having a solids content of 72.4%, a viscosity of $Z_6$ (Gardner) and a color of 1 (Gardner-Holdt).

EXAMPLE 2

| Parts | Preparation of Pigmented Coating Composition (Conventional) Description |
|---|---|
| 13.87 | Water |
| 9.00 | Propylene glycol |
| 0.87 | Anionic Surfactant (sodium salt of polyacrylic acid)* |
| 7.30 | Titanium dioxide (rutile) |

Example 2-continued

| Parts | Preparation of Pigmented Coating Composition (Conventional) Description |
|---|---|
| 1.62 | Clay (delaminated) |
| 0.10 | Biocide |
| 0.47 | Fungicide |
|  | Grind the above, then add: |
| 7.91 | Water |
| 0.28 | Defoamer |
| 51.00 | Acrylic emulsion (Note 1) |
| 5.00 | Emulsified polyester (Note 2) |
| 0.12 | Drier (cobalt 5%) |
| 0.28 | Defoamer |
| 2.00 | Water |
| 0.36 | Hydroxy ethylcellulose thickener |

*The commercial product Tamol 731 of Rohn & Haas may be used if desired.

Evaluation

Pigment volume concentration = 25%
Nonvolatile matter = 40% (by volume).
Gloss at 60° = 20.

EXAMPLE 3

| Parts | Preparation of Pigmented Coating Composition in Accordance with the Invention Description |
|---|---|
| 4.05 | Resin solution of Example 1 |
| 0.69 | Dimethyl ethanol amine |
| 9.00 | Propylene glycol |
| 7.30 | Titanium dioxide (rutile) |
| 1.62 | Clay (delaminated) |
| 0.10 | Biocide |
| 0.48 | fungicide |
|  | Grind the above, then add: |
| 23.03 | Water |
| 0.29 | Defoamer |
| 51.00 | Acrylic emulsion (Note 1) |
| 0.28 | Defoamer |
| 2.00 | Water |
| 0.36 | Hydroxy ethylcellulose thickener |
| Evaluation |  |
| Pigment volume concentration = 25% |  |
| Nonvolatile matter = 40% (by volume) |  |
| Gloss at 60° = 60 |  |

*Up to 3.45 parts of titanium dioxide rutile can bedispersed in one part of this blend.
Note 1The acrylic emulsion utilized is prepared in accordance with the teachings of Example 2 of United States Patent 3,356,653.
Note 2The emulsified polyester is prepared by esterifying a styrene-allyl alcohol copolymer (Monsanto product RJ-100)with linseed fatty acids and emulsifying in water in the presence of a nonionic surfactant (Igepal 630 - GeneralAniline may be used).

As will be seen, the invention has been illustrated by a comparison between two similar latex paints, one produced in conventional fashion (Example 2), and the other produced in accordance with the teachings of this invention (Example 3).

The generally superior properties which are produced have been described previously, and the marked increase in gloss (from 20 to 60 measured on a 60° glossmeter) represents a large increase which stands out under the most casual inspection.

The invention is defined in the claims which follow.

We claim:

1. A method of producing a high gloss finish employing a water base, pigmented, latex paint which is air dried comprising, grinding a pigment into a water-free solution of an at least partially neutralized carboxyl-functional addition copolymer of monoethylenically unsaturated monomers including at least about 3% by weight of monoethylenically unsaturated carboxylic acid in water miscible organic solvent, the major proportion of said pigment being titanium dioxide, and the pigment volume concentration being at least 10%, said copolymer being at least partially neutralized with an hydroxy amine having the formula:

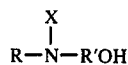

in which R is hydrogen or an alkyl group, R' is an alkylene group, and X is either R or R'OH, to render the said copolymer dispersible in water, and thereby form a nonaqueous pigment paste, mixing the nonaqueous pigment paste with an air drying aqueous latex consisting essentially of emulsified aqueous emulsion copolymer particles having a $T_g$ below 20° C., applying the resulting latex paint to a substrate and air drying the paint.

2. A method as recited in claim 1 in which said hydroxy amine is a tertiary amine and said R and R' groups contain from 1-4 carbon atoms.

3. A method as recited in claim 1 in which said hydroxy amine is dimethyl ethanol amine.

4. A method as recited in claim 1 in which said carboxyl-functional addition copolymer is a solution copolymer and said water miscible organic solvent is used in an amount of from 10% to 150%, based on the weight of the solution copolymer.

5. A method as recited in claim 1 in which said copolymer contains up to about 40% of monoethylenically unsaturated carboxylic acid.

6. A method as recited in claim 5 in which said copolymer is a solution copolymer containing from 15-30% of monoethylenically unsaturated carboxylic acid, and said hydroxy amine is used in an amount to neutralize at least 50% of the acid groups in the copolymer.

7. A method as recited in claim 5 in which the monomers of said copolymer consist essentially of methyl methacrylate, styrene, vinyl toluene, or vinyl acetate, in combination with $C_2 - C_8$ alkyl ester of monoethylenically unsaturated carboxylic acid in addition to said acid.

8. A method as recited in claim 7 in which said copolymer monomers further include monoethylenically unsaturated hydroxy monomer or monoethylenically unsaturated amide monomer.

9. A method as recited in claim 1 in which said emulsion copolymer is selected from vinyl acetate-butyl acrylate copolymers, vinyl acetate-ethylene copolymers, and methyl methacrylate-ethyl acrylate copolymers.

* * * * *